United States Patent Office 3,809,734
Patented May 7, 1974

3,809,734
FOAM PLASTIC SHEET FORMING PROCESS AND FOAM PLASTIC SHEET WITH HAIR-LIKE PILES
Tatsuo Watanabe, 5–3 Okuzawa 6-chome, Tokyo, Japan
Filed Nov. 12, 1971, Ser. No. 198,119
Claims priority, application Japan, Nov. 14, 1970, 45/100,337
Int. Cl. B29d 7/20, 9/00, 31/00
U.S. Cl. 264—51    12 Claims

ABSTRACT OF THE DISCLOSURE

This disclosure relates to a molding process and the plastic sheet produced by said process. The process is characterized by calender pressing a sheet of thermoplastic foam against a heated roll mold having a multiplicity of close-spaced needle-like holes in its surface, pressure-molding the outer layer of the base foam-plastic material sheet into the needle-like holes, by strongly applied external pressure and internal foaming pressure and removing said formed plastic sheet by cooling the sheet just prior to removal and removing the sheet in a hot surrounding atmosphere, thereby stretching the needle-like molded piles to from 3 to 5 times the depth of the needle-like holes.

---

This invention relates to a molding process and the plastic sheet produced by said process.

The process is characterized by calender pressing a sheet of thermoplastic foam against a heated roll mold having a multiplicity of close-spaced needle-like holes in its surface, pressure-molding the outer layer of the base foam-plastic material sheet into the needle-like holes, by strongly applied external pressure and internal foaming pressure and removing said formed plastic sheet by cooling the sheet just prior to removal and removing the sheet in a hot surrounding atmosphere, thereby stretching the needle-like molded piles to from 3 to 5 times the depth of the needle-like holes.

The process of forming needle-like piles by pressing a thermoplastic sheet against a heated mold with a multiplicity of needle-like holes and removing the molded plastic within said holes without stretching or with stretching of the formed piles is already known in the art. However, in the first case the needle-like piles are perpendicular and are not free to move in various directions, whereas, in the latter case, the piles become curled and have no directional characteristics. Furthermore, these piles do not have a soft feeling to the touch.

An object of this invention is to provide a molding process whereby foam thermoplastic sheet which has an expansion rate of from 1.5 to 10 and still retains expansion capability is pressed against a mold with needle-like holes so that its outer layer is squeezed into said holes by the externally applied pressure, and the internal pressure generated by the foaming process.

Another object of this invention is to provide a molding process whereby thermoplastic material containing a foaming agent is squeezed into needle-like holes and is removed while being stretched to from 3 to 5 times the hole depth.

Still another object is to provide plastic sheets with hair-like piles characterized by said piles containing minute cavities elongated in a longitudinal direction internally at their base.

Yet another object is to provide an inherently light weight and flexible plastic sheet with hair-like piles wherein said piles are pliant and free from directional stiffness, and are capable of bending down in their stroked direction, or are pliant and bent down in one direction.

The above objects and still further objects of the invention will immediately become apparent to those skilled in the art after consideration of the following specific preferred embodiments thereof which is provided by way of example and not by way of limitation, wherein.

Figure 1:
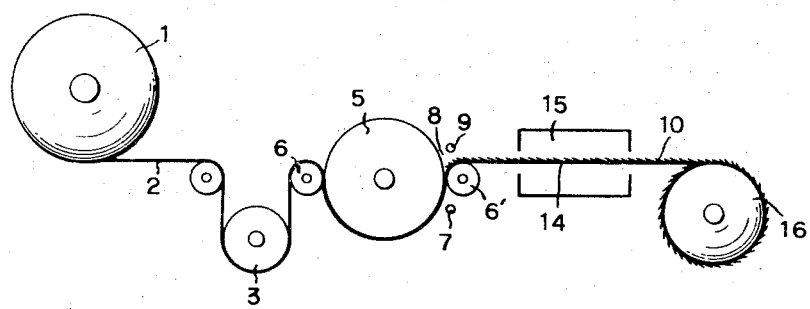
FIG. 1 depicts an embodiment of the forming process in accordance with the present invention.

The invention includes squeezing a foam thermoplastic sheet with or without a suitable cloth backing with a preheated or unheated mold containing a multiplicity of needle-like holes in its surface. The surface layer of the thermoplastic sheet is squeezed into the needle-like holes by the externally applied pressure and internally generated pressure due to foaming. Just prior to removal of the sheet, cold water is sprayed on the rear side thereof to cool the sheet and simultaneously hot water or hot air is sprayed on the parting parts of the sheet. The sheet with the formed piles is removed in such a manner that the piles are stretched from 3 to 5 times the depth of the needle-like holes. The hair-like piles, especially the base of said piles, contain elongated cavities and are soft to the touch. Where the piles are short in length, they have no directional orientation and will lie down in the direction in which they are stroked. The texture closely resembles natural suede leather in this case, whereas for long piles their directionality may be oriented and resemble furs. Also, the foam containing base sheet makes the product pliable and soft to the touch. The product is light in weight and suitable for shoe tops, the interior decoration of rooms, automotive mats, animal toys, etc. Materials suitable for use as thermoplastic sheets as disclosed in this invention are polyethylene, polyvinylchloride, polyurethane, nylon, copolymers of polyethylene and polyvinylalcohol, etc. to which from 1 to 5% by weight of known foaming agents such as, for example, azo bis formamide, dinitroso pentamethyl tetramine, p,p'-oxybis-benzene sulfonyl hydrazide etc. is added. This mixture is made into sheets with a thickness of from 0.3 to 3 mm. This sheet is heated to a suitable temperature and allowed to foam with a foam ratio of from 1.5 to 10 times in bulk, which is made into a middle product that still retains foaming properties and has a thickness of from 0.5 to 5 mm. This intermediary thermoplastic sheet will further expand with the application of heat.

The needle-like holes bored in the surface of the mold have a radius of from 0.1 to 2 mm. and a depth of from 0.2 to 10 mm. The density of the holes in the mold is from 20 to 2500 per cm.$^2$. The surface temperature of the mold is held at from 80 to 200° centigrade by super-heated steam or heated oil. The most suitable temperature is determined depending on the base plastic material, foaming agent used, foaming temperature, the surface speed of the roll mold, the depth of the needle-like holes.

The water used for cooling the sheet just prior to removing it from the mold is held at a temperature below 15° C. The hot water or hot air sprayed on the parting portion of the sheet and the mold is adjusted to hold the surrounding temperature at from 40 to 100° C. When the amount of elongation of the plastic forced into the needle-like holes should be kept small, the surrounding temperature is reduced, and when the elongation desired is large, the temperature is increased.

Figure 2:
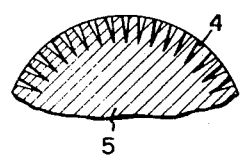
FIG. 2 is a partial enlarged sectional view of the roll mold.
Figure 3:
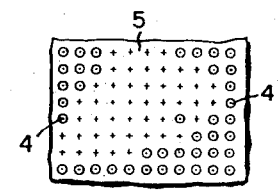
FIG. 3 is a partial enlarged plan view of the roll mold.
Figure 4:
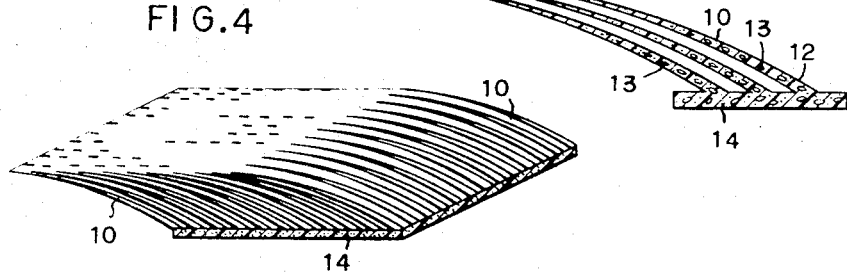
FIG. 4 is an enlarged oblique view of the product.
Figure 5:
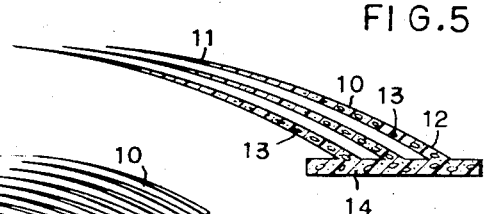
FIG. 5 is an enlarged sectional view of the hair-like piles of the product shown in FIG. 4.

This invention will now be described according to the process shown in FIGS. 1, 2 and 3, and the products shown in FIGS. 4 and 5. Roll 1 contains polyethylene foam sheet 2, with a thickness of 1 mm. and expanded by a suitable foaming agent and application of heat to two times in foam-ratio, which is unrolled at a speed of 1.5 meters per minute and is wrapped around and pre-heated by preheater roll 3 which is heated to a surface temperature of from 80 to 100° C. The pre-heated sheet 2 is pressed against molding roll 5, which has needle-like holes 4 (FIGS. 2 and 3) of 0.3 mm. diameter and a depth of 4 mm. with a density of 750 holes to a square centimeter, by means of pressure roll 6, the surface of which is covered with soft rubber, with a pressure of 10 kg. per cm.² The outer surface layer of sheet 2 containing cavities and a foaming agent is forced into needle-like holes 4 by means of the external pressure applied by the pressure roll 6 and the internal pressure caused by the expansion of the cavities and the generation of foam by the foaming agent. The still active foaming agent contained in the plastic forced into the mold causes further expansion to increase the internal pressure, and completely fill the needle-like holes so that the extremity of the plastic touches the bottom of the needle-like holes.

Just before sheet 2 is removed from molding roll 5 by peeling roll 6', water cooled to 10° C. is sprayed on the rear side of the sheet through cold water spraying pipe 7 by which the sheet is cooled and hardened. Hot water or hot air is applied to the peeling point 8 of the sheet and the mold roll by means of spraying pipe 9 in a suitable amount to keep the temperature at the peeling point at 50° C. so that when the sheet is peeled, the foam thermoplastic embedded in the needle-like hole is stretched under the above mentioned heat, and is pulled in a direction opposite to the direction of travel of the sheet to form curved hair-like piles 10 curved opposite to the direction of travel with a length of about 16 mm.

Extremity 11 of said hair-like piles hardly contains any foam cavities whereas base part 12 contains numerous cavities 13 elongated in the direction of the hair-like piles 10. Sheet 14 peeled from mold roll 4 is made to pass through cooling chamber 15 where it is cooled and then is wound onto the roll 16.

Figure 6:
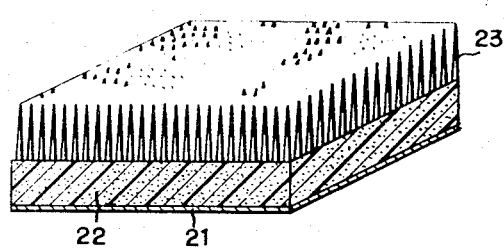
FIG. 6 is an enlarged oblique view of a second product which is an embodiment of this invention.
Figure 7:
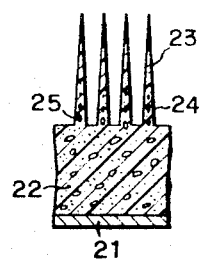
FIG. 7 is an enlarged sectional view of the product shown in FIG. 6.

An alternative product which is an embodiment of this invention is shown in FIGS. 6 and 7 where the 1 mm. thick polyethylene foam plastic sheet, expanded to two times in foam ratio, has cotton cloth 21 cemented to it as backing material. The travel speed of the sheet is adjusted to 2 meters per minute. The surface of the sheet is pre-heated to from 80° to 100° C. after which it is molded by mold roll 5 with needle-like holes of 0.2 mm. diameter and 0.5 mm. deep with a density of 1100 holes per cm.² The foam plastic sheet surface is densely covered by fine hair-like piles 23 with lengths of from 1.5 to 2 mm.

The base 24 of the fine hair-like piles 23 contains cavities 25 elongated longitudinally with the hair of 10 so that said hairs are soft to the touch and have low stiffness such that the hairs are nondirectionally oriented and will lie down in the direction they are stroked by hand and will retain this condition.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

What is claimed is:
1. A molding process for forming foam plastic sheets with hair-like pile comprising the steps of:
   (1) providing a sheet of thermoplastic material provided with a foaming agent rendering it capable of foaming when heated,
   (2) providing a heated mold having a plurality of closely spaced needle-shaped holes formed therein,
   (3) forcing said sheet against said heated mold to force some of said plastic sheet material into said holes, said plastic sheet material forced into said holes expanding therein by the foaming action of the material,
   (4) applying a coolant to the outer surface of said sheet just prior to removing it from said mold and then removing said sheet from said mold, and
   (5) applying heat of between 40° and 100° C. to the inner surface of the sheet during removal thereof from the mold to elongate the plastic material being withdrawn from the holes.
2. A process according to claim 1 wherein said mold is heated to a temperature in the range of 80° and 100° C.
3. A process according to claim 1 wherein said coolant is a water spray having a temperature below 15° C.
4. A process according to claim 2 wherein said coolant is a water spray having a temperature below 15° C.
5. A process according to claim 1 wherein the heat applied to the inner surface of said sheet is provided by a fluid having a temperature in the range of 40° to 100° C.
6. A process according to claim 2 wherein the heat applied to the inner surface of said sheet is provided by a fluid having a temperature in the range of 40° to 100° C.
7. A process according to claim 3 wherein the heat applied to the inner surface of said sheet is provided by fluid having a temperature in the range of 40° to 100° C.
8. A process according to claim 4 wherein the heat applied to the inner surface of said sheet is provided by fluid having a temperature in the range of 40° to 100° C.
9. The process of claim 1 wherein the mold comprises a roller which is rotated to continuously form a plastic sheet with hair-like piles.
10. The process of claim 2 wherein the mold comprises a roller which is rotated to continuously form a plastic sheet with hair-like piles.
11. A sheet with hair-like piles extending therefrom and integral therewith, said piles containing cavities therein, the number of cavities in said pile decreasing with increased distance thereof from said sheet.
12. A sheet according to claim 11 wherein the sheet and pile are formed from a thermoplastic foamable material.

References Cited
UNITED STATES PATENTS

| | | | |
|---|---|---|---|
| 2,865,046 | 12/1958 | Bird | 264—47 |
| 3,098,262 | 7/1963 | Wisotzky | 264—214 |
| 3,220,901 | 11/1965 | Holmstrom et al. | 264—47 |
| 3,243,485 | 3/1966 | Griffin | 264—47 |
| 3,632,842 | 1/1972 | Forrest | 264—214 |
| 3,655,840 | 4/1972 | Krug | 264—45 |
| 3,708,565 | 1/1973 | Seiffert | 264—47 |

DONALD E. CZAJA, Primary Examiner

R. W. GRIFFIN, Assistant Examiner

U.S. Cl. X.R.

161—62; 264—47, 167, 243, 331